US012577747B2

(12) United States Patent
Ishibashi

(10) Patent No.: US 12,577,747 B2
(45) Date of Patent: Mar. 17, 2026

(54) MANAGEMENT SYSTEM AND METHOD OF PNEUMATIC FENDER

(71) Applicant: THE YOKOHAMA RUBBER CO., LTD., Hiratsuka (JP)

(72) Inventor: Yusuke Ishibashi, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 0 days.

(21) Appl. No.: 19/100,252

(22) PCT Filed: Apr. 24, 2023

(86) PCT No.: PCT/JP2023/016088
§ 371 (c)(1),
(2) Date: Jan. 31, 2025

(87) PCT Pub. No.: WO2024/089915
PCT Pub. Date: May 2, 2024

(65) Prior Publication Data
US 2025/0257537 A1 Aug. 14, 2025

(30) Foreign Application Priority Data
Oct. 24, 2022 (JP) ................................. 2022-169804

(51) Int. Cl.
*E02B 3/26* (2006.01)
*G06K 19/07* (2006.01)
*G06K 19/077* (2006.01)

(52) U.S. Cl.
CPC ............ *E02B 3/26* (2013.01); *G06K 19/0717* (2013.01); *G06K 19/07749* (2013.01)

(58) Field of Classification Search
CPC . E02B 3/26; G06K 19/0717; G06K 19/07749
See application file for complete search history.

(56) References Cited

U.S. PATENT DOCUMENTS 6,448,903 B1 9/2002 Hattori
7,107,922 B2 9/2006 Hattori
(Continued)

FOREIGN PATENT DOCUMENTS

CN 112539894 A 3/2021
EP 2 876 032 A1 5/2015
(Continued)

*Primary Examiner* — Ryan W Sherwin
(74) *Attorney, Agent, or Firm* — Carrier, Shende & Associates P.C.; Joseph P. Carrier; Fulchand P. Shende

(57) ABSTRACT

A management system and method that can easily and more stably grasp a condition of an individual pneumatic fender and has excellent maintainability a passive IC tag, a pressure sensor, and a temperature sensor which are activated by a transmission radio wave from a communication unit outside a pneumatic fender in which the passive IC tag integrating the pressure sensor and the temperature sensor is installed. A return radio wave from the IC tag activated is transmitted in response to the transmission radio wave, wireless communication between the IC tag and the communication unit is performed, the communication unit thus acquires identification information of the IC tag and detection data of the pressure sensor and the temperature sensor when the IC tag is activated, and a calculation device specifies the pneumatic fender based on the identification information and determines a condition of the pneumatic fender based on the detection data.

7 Claims, 11 Drawing Sheets

(56)        References Cited

U.S. PATENT DOCUMENTS

| | | | |
|---|---|---|---|
| 8,519,828 B2 | 8/2013 | Nakatani et al. | |
| 11,053,648 B2 | 7/2021 | Hou et al. | |
| 2021/0016614 A1* | 1/2021 | Fenkanyn | ........... B60C 23/0493 |
| 2022/0128120 A1 | 4/2022 | Hayashi et al. | |

FOREIGN PATENT DOCUMENTS

| | | | | |
|---|---|---|---|---|
| EP | 3 795 974 A1 | 3/2021 | | |
| JP | H08-43226 A | 2/1996 | | |
| JP | H09-318478 A | 12/1997 | | |
| JP | 2015-143672 A | 8/2015 | | |
| JP | 2018-127044 A | 8/2018 | | |
| JP | 2020-118297 A | 8/2020 | | |
| WO | 99/20845 A1 | 4/1999 | | |
| WO | 2011/155265 A1 | 12/2011 | | |
| WO | WO-2021132774 A1 * | 7/2021 | ............... | G01L 9/00 |

* cited by examiner

MANAGEMENT SYSTEM AND METHOD OF PNEUMATIC FENDER

TECHNICAL FIELD

The present invention relates to a management system and method for grasping a condition of a pneumatic fender.

BACKGROUND ART

A management system for grasping a use state of a pneumatic fender installed on a quay or the like has been proposed (see Patent Document 1). The management system proposed in Patent Document 1 includes an identification tag and a sensor installed in a pneumatic fender and a receiving device that receives radio waves from the sensor. Using a pressure sensor and a temperature sensor as the sensor can grasp the internal pressure and the internal temperature of the pneumatic fender. Using a passive RFID tag as the identification tag eliminates the need for a battery to acquire information of the identification tag.

In this management system, the identification tag and the sensor are provided separately and individually on the pneumatic fender, causing attachment work and maintenance work to be complicated. Further, the sensor is driven by a built-in battery (paragraph 0022). The battery needs to be replaced when it is weak, causing the maintenance work to be more complicated. The battery of the pneumatic fender in use cannot be easily replaced, and thus the internal pressure and the internal temperature of the pneumatic fender cannot be grasped until the weak battery is replaced. Thus, there is room for improvement in easily and more stably grasping the condition of each pneumatic fender and improving the maintainability.

CITATION LIST

Patent Literature

Patent Document 1: WO 2011/155265

SUMMARY OF INVENTION

Technical Problem

An object of the present invention is to provide a management system and method that can easily and more stably grasp a condition of an individual pneumatic fender and has excellent maintainability.

Solution to Problem

A management system of a pneumatic fender according to an embodiment of the present invention to achieve the object described above includes: a pneumatic fender including a body including a body portion having a cylindrical shape, bowl-shaped end portions connected to both sides of the body portion in an axial direction, and a cap portion attached to at least one of the bowl-shaped end portions; an IC tag of a passive type installed in the pneumatic fender; a pressure sensor configured to detect an internal pressure of the pneumatic fender and a temperature sensor configured to detect a temperature of an internal space of the pneumatic fender; and a communication unit disposed outside the pneumatic fender, an individual of the pneumatic fender is specified based on identification information of the IC tag acquired by the communication unit, and a condition of the pneumatic fender is determined based on detection data from the pressure sensor and the temperature sensor acquired by the communication unit. The pressure sensor and the temperature sensor are installed on the IC tag and integrated with the IC tag. The management system includes a calculation device to be communicably connected to the communication unit. The IC tag is activated by a transmission radio wave transmitted from the communication unit, the pressure sensor and the temperature sensor is activated, a return radio wave is transmitted from the IC tag activated in response to the transmission radio wave, and wireless communication between the IC tag and the communication unit is thus performed. The identification information is acquired by the communication unit through the wireless communication and is input to the calculation device, and the detection data from the pressure sensor and the temperature sensor when the IC tag is activated is acquired by the communication unit through the wireless communication and is input to the calculation device. By the calculation device, an individual of the pneumatic fender is specified based on the identification information input, and a condition of the pneumatic fender is determined based on each detection data input.

A management method of a pneumatic fender according to an embodiment of the present invention includes: disposing, in a pneumatic fender including a body including a body portion having a cylindrical shape, bowl-shaped end portions connected to both sides of the body portion in an axial direction, and a cap portion attached to at least one of the bowl-shaped end portions, an IC tag of a passive type, a pressure sensor configured to detect an internal pressure of the pneumatic fender, and a temperature sensor configured to detect a temperature of an internal space of the pneumatic fender; disposing a communication unit outside the pneumatic fender; and specifying an individual of the pneumatic fender based on identification information of the IC tag acquired by the communication unit and determining a condition of the pneumatic fender based on detection data from the pressure sensor and the temperature sensor acquired by the communication unit. The management method includes: installing the pressure sensor and the temperature sensor on the IC tag, integrating the pressure sensor and the temperature sensor with the IC tag, and providing a calculation device to be communicably connected to the communication unit; activating the IC tag by using a transmission radio wave transmitted from the communication unit, activating the pressure sensor and the temperature sensor, transmitting a return radio wave from the IC tag activated in response to the transmission radio wave, and thus performing wireless communication between the IC tag and the communication unit; acquiring the identification information at the communication unit through the wireless communication, inputting the identification information to the calculation device, acquiring, at the communication unit through the wireless communication, the detection data from the pressure sensor and the temperature sensor when the IC tag is activated, and inputting the detection data to the calculation device; and by the calculation device, specifying an individual of the pneumatic fender based on input identification information and determining a condition of the pneumatic fender based on each detection data input.

Advantageous Effects of Invention

According to the present invention, the identification information and the detection data can be acquired by performing wireless communication between the IC tag and the communication unit. Then, based on the acquired identification information and the detection data, the condition of each pneumatic fender can be easily grasped. The pressure sensor and the temperature sensor are installed on the IC tag and are integrated with the IC tag, allowing man-hours for mounting these parts on the pneumatic fender to be reduced. Furthermore, the IC tag, the pressure sensor, and the temperature sensor are activated by the transmission radio wave transmitted from the communication unit. Therefore, it is not necessary to provide a battery in these parts. That is, there is no need to replace the battery of these parts, and there is no risk of data being unable to be acquired due to a weak battery. This improves maintainability and is advantageous for stably grasping the condition of each pneumatic fender for the long term.

DESCRIPTION OF EMBODIMENTS

A management system and method of a pneumatic fender according to an embodiment of the present invention will be described below with reference to the drawings.

Figure 1:
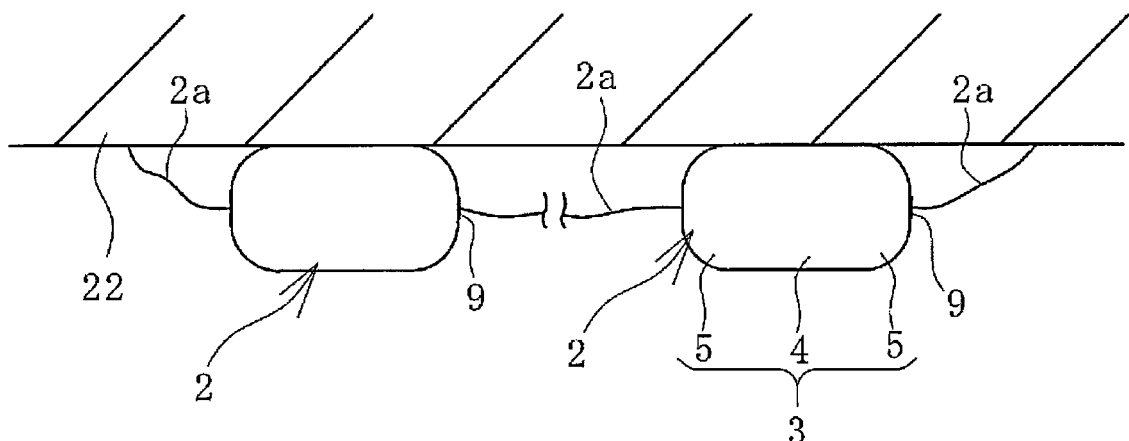
FIG. 1 is an explanatory diagram illustrating a pneumatic fender installed on a quay in a top view.

As illustrated in FIG. 1, a pneumatic fender 2 (hereinafter, referred to as a fender 2) is used by being attached to an installation location such as a quay 22 or a side of a watercraft using a guy rope 2a or the like. The fender 2 includes a body 3 including a bowl-shaped end portion 5 connected to both ends of a body portion 4 having a cylindrical shape, and a cap portion 9 provided on the body 3. In this embodiment, the cap portion 9 is provided only on one of the bowl-shaped end portions 5, but it may be provided on the bowl-shaped end portion 5 at both sides.

In FIG. 1, a plurality of fenders 2 are installed at intervals, but a single fender 2 may be installed. The fender 2 may be installed in a horizontal state with the bowl-shaped end portions 5 on the left and right sides, or in a vertical state with the bowl-shaped end portions 5 on the top and bottom sides.

An embodiment of a management system 1 of the pneumatic fender illustrated in FIGS. 1 to 4 (hereinafter referred to as a management system 1) is used to grasp the condition of individual fender 2. As illustrated in FIG. 1, the management system 1 can be used not only to grasp the condition of the fender 2 installed and used at the installation location in an expanded state at a specified internal pressure, but also to grasp the condition of the fender 2 stored in a warehouse or the like, for example.

Describing the structure of the fender 2 in detail, the body 3 is formed by layering a plurality of reinforcing layers 7 between inner layer rubber 6 and outer layer rubber 8. Each of the reinforcing layers 7 constituting the body portion 4 is formed of multiple cords that are aligned to extend in parallel to a cylinder axial direction of the body portion 4 having a cylindrical shape at a predetermined cord angle. Furthermore, the cords of the reinforcing layers 7 layered adjacently have an intersecting bias structure.

Figure 2:
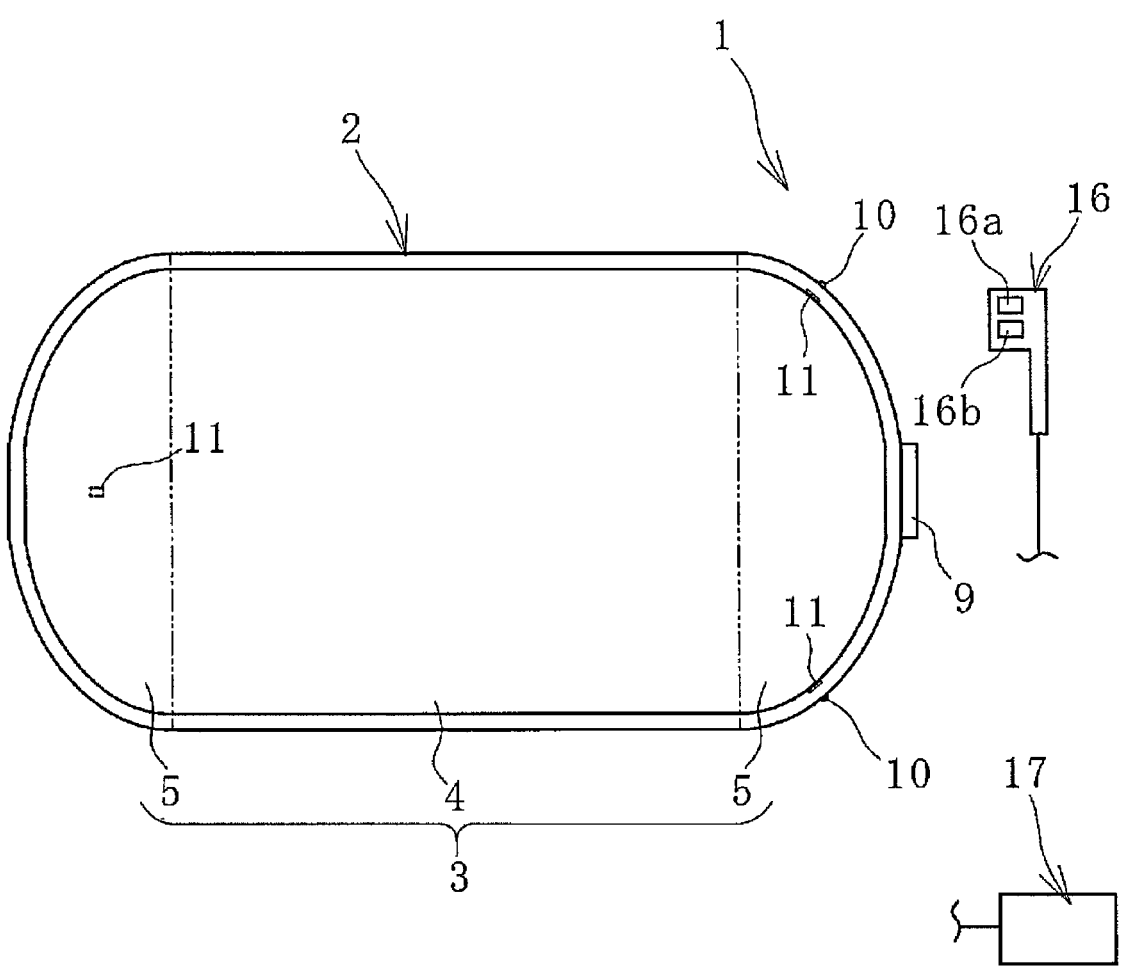
FIG. 2 is an explanatory diagram illustrating a management system of a pneumatic fender according to an embodiment, with the fender in a longitudinal cross-sectional view.

The reinforcing layers 7 constituting each of the bowl-shaped end portions 5 are formed by alternately layering a cord layer formed of cords extending radially from the circular center of the bowl-shaped end portion 5 and a cord layer formed of cords extending in the circumferential direction. In other words, the multilayer structure of the reinforcing layers 7 of the bowl-shaped end portion 5 has a so-called radial structure. In FIG. 2, a boundary between the body portion 4 and each bowl-shaped end portion 5 is illustrated by a two-dot chain line for reference.

The management system 1 includes the fender 2, a passive IC tag 11, a pressure sensor 15a, and a temperature sensor 15b installed in the fender 2, a communication unit 16 disposed outside the fender 2, and a calculation device 17 to be communicably connected to the communication unit 16. The pressure sensor 15a and the temperature sensor 15b are installed on the IC tag 11 and are integrated with the IC tag 11. In this embodiment, the IC tag 11 is embedded in the inner layer rubber 6 of the body 3. Wireless communication between the IC tag 11 and the communication unit 16 is performed, and desired information and data are acquired by the communication unit 16 from the IC tag 11.

Figure 5:
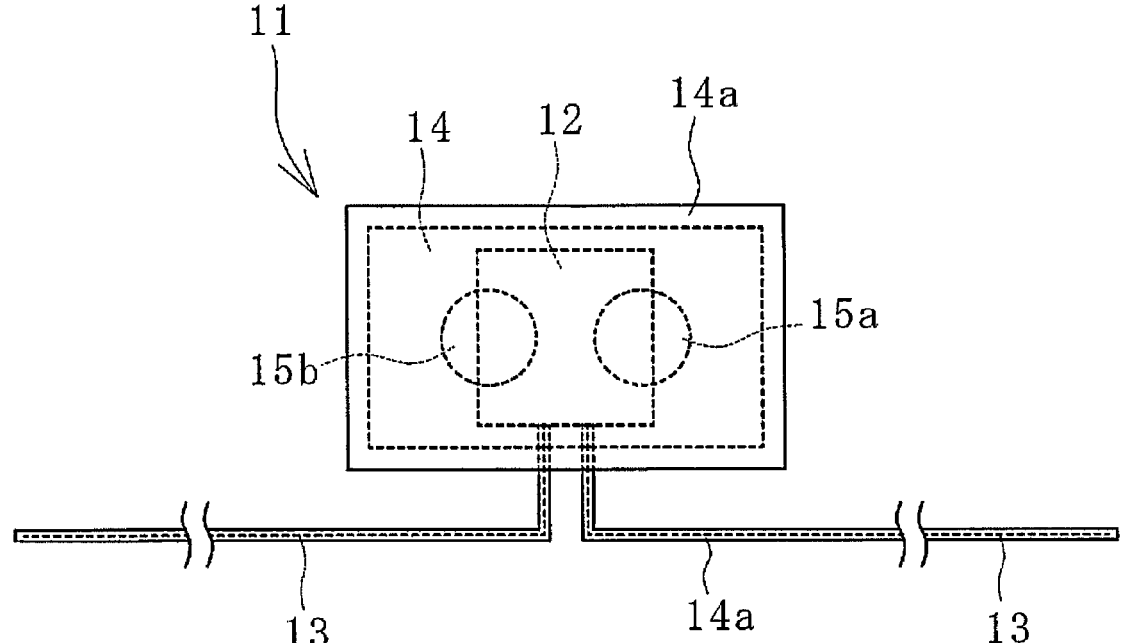
FIG. 5 is an explanatory diagram illustrating an IC tag in a plan view.
Figure 6:
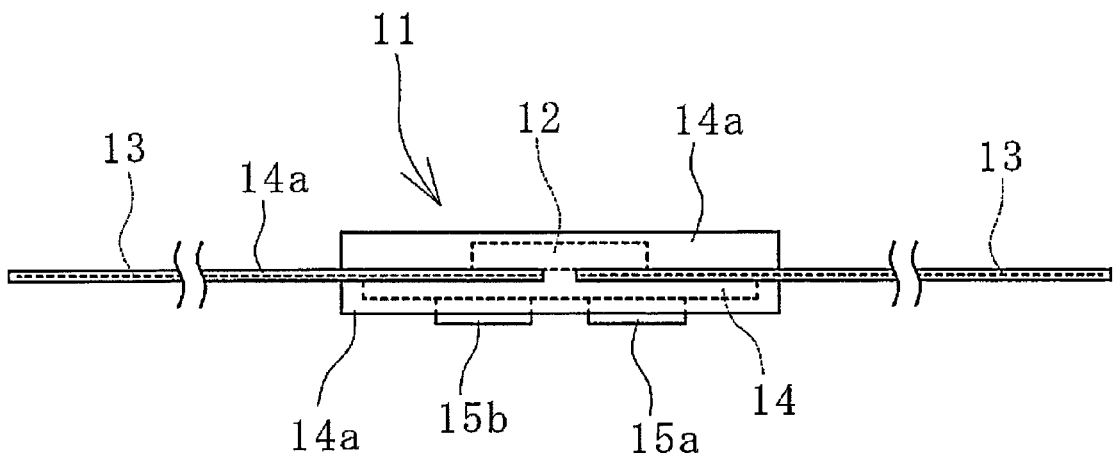
FIG. 6 is an explanatory diagram illustrating the IC tag of FIG. 5 in a front view.

As illustrated in FIGS. 5 and 6, the IC tag 11 includes an IC chip 12 and an antenna unit 13 connected to the IC chip 12. The pressure sensor 15a and the temperature sensor 15b are connected to the IC tag 11 (the IC chip 12). The size of the IC chip 12 is very small, for example, with a vertical dimension and a horizontal dimension of 50 mm or less (equivalent to an outer diameter of 50 mm or less) and a thickness of 5 mm or less. The size of the antenna unit 13 is also very small. In this embodiment, the antenna unit 13 adopted is a dipole type and consists of a metal monofilament extending symmetrically from the IC chip 12. The length of each metal monofilament is about 10 mm or more and 200 mm or less.

In detail, the IC tag 11 includes an IC chip 12 and an antenna unit 13 connected to the IC chip 12. The IC chip 12 optionally can store tag-specific information such as an identification number A of the IC tag 11 and other necessary information. The IC tag 11 adopts commonly available specifications, and for example, an RFID tag can be used as the IC tag 11.

The IC chip 12 is located on a top surface of a substrate 14. The pressure sensor 15a and the temperature sensor 15b connected to the IC chip 12 are disposed on a back surface of the substrate 14. The antenna unit 13 (metal monofilament) protrudes and extends from the substrate 14. The antenna unit 13 is not limited to the dipole type described above, and various known types may be employed. For example, a ceramic antenna formed on the substrate 14 may be employed.

The body 3 may be brought into a contracted state by discharging air from the internal space thereof, or may be brought into an expanded state by injecting air into the internal space of the body 3 in the contracted state. Adopting the antenna unit 13 that is a dipole type and consists of a metal monofilament provides excellent bending durability, which is advantageous in avoiding damage even if the body 3 is greatly deformed.

Figure 4:
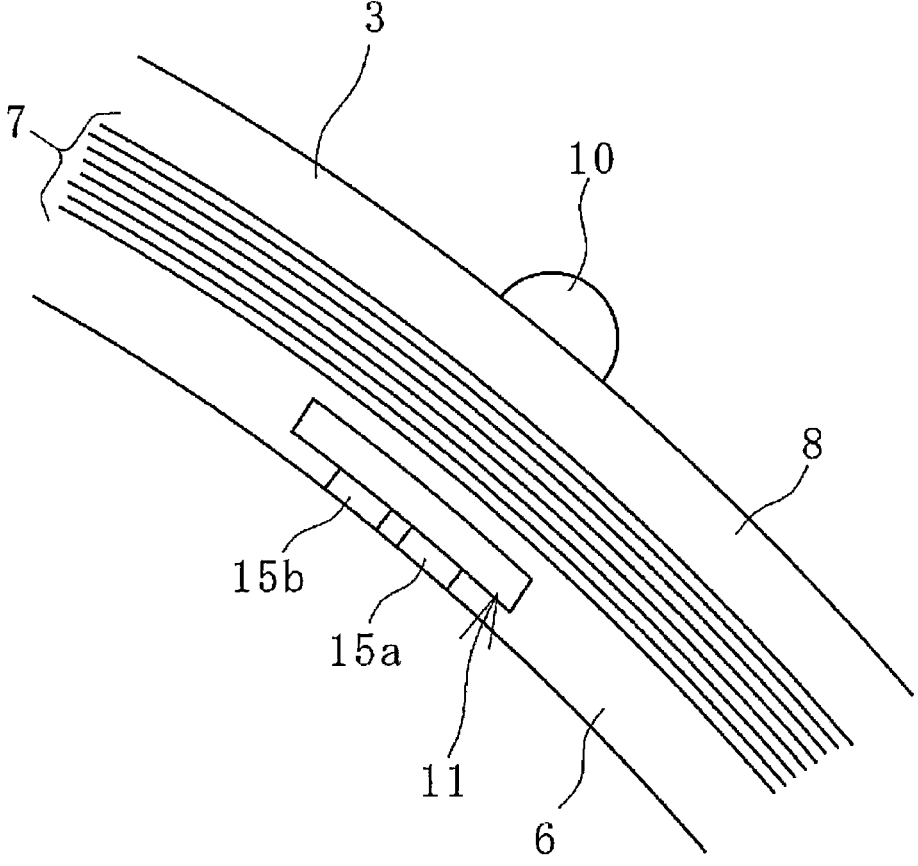
FIG. 4 is an enlarged explanatory diagram illustrating the vicinity of the IC tag of FIG. 3.

The IC tag 11 is covered with an insulating layer 14a, and the entire IC tag 11 is electrically insulated from the outside. However, detection portions of the pressure sensor 15a and the temperature sensor 15b are not covered with the insulating layer 14a and are exposed from the surface of the insulating layer 14a. Then, as illustrated in FIG. 4, in the IC tag 11 embedded in the inner layer rubber 6 of the body 3, only the detection portions of the pressure sensor 15a and the temperature sensor 15b are exposed to the internal space of the fender 2.

As the insulating layer 14a, resins such as acrylonitrile-butadiene-styrene (ABS), polyvinyl chloride, polycarbonate, polyimide, and epoxy can be used. Polyvinyl chloride is very suitable for covering the antenna unit 13 (metal monofilament) extending long because of its excellent flexibility.

The IC tag 11 may be installed not only in the body 3 but also in the cap portion 9. However, it is easy to install the IC tag 11 in a state of being embedded in the body 3. In the body 3, the IC tag 11 is preferably embedded in the inner layer rubber 6 of the bowl-shaped end portion which is not easily deformed or subjected to an external force. If a large number of tires are installed on the outer surface of the body 3 using a chain net, the chain net and the tires become obstacles to the wireless communication between the IC tag 11 and the communication unit 16. Therefore, the IC tag 11 needs to be disposed at a position that is not covered by the chain net or the tire provided on the outer surface of the body 3. It is difficult to change the positions of the chain net and the tire in the body portion 4. However, the positions thereof can be slightly adjusted in the bowl-shaped end portion 5, and from this point of view, the IC tag 11 is preferably embedded in the inner layer rubber 6 of the bowl-shaped end portion 5.

The IC tag 11 may be installed in a state where it is embedded in the body 3 in a manufacturing process of the fender 2. That is, by embedding the IC tag 11 in the inner layer rubber 6 in a molding process of the body 3 and then vulcanizing the body 3, the IC tag 11 can be installed in a state where it is embedded in the body 3.

In this embodiment, the IC tag 11 is provided at each bowl-shaped end portion 5. In each of the bowl-shaped end portions 5, the IC tags 11 are disposed at multiple sections (two sections) spaced apart in the circumferential direction. Further, the IC tags 11 installed in the bowl-shaped end portion 5 are disposed at positions shifted by 90° from each other in the circumferential direction.

An embedding mark 10 indicating an embedding position of the IC tag 11 is provided on the outer surface of the body 3 (the surface of the outer layer rubber 8) corresponding to the embedding position of each IC tag 11. In this embodiment, the embedding mark 10 is a protruding portion. However, a form of the embedding position mark 10 is not limited as long as it can indicate the embedding position of the IC tag 11, and it may be a recessed portion or a printed display.

The pressure sensor 15a detects the internal pressure of the fender 2. As the pressure sensor 15a, various known types can be adopted as long as it can be attached to the IC tag 11. Detection data D1 detected by the pressure sensor 15a is acquired by the communication unit 16.

The temperature sensor 15b detects the temperature of the internal space of the fender 2. As the temperature sensor 15b, various known types can be adopted as long as it can be attached to the IC tag 11. Detection data D2 detected by the temperature sensor 15b is acquired by the communication unit 16.

The temperature sensor 15b according to this embodiment includes two detection portions, and one of the detection portions detects the temperature of the internal space of the fender 2. Then, the other of the detection portions detects the temperature of the body 3 (the inner layer rubber 6) at the position where the temperature sensor 15b is embedded. The temperature of the body 3 detected by the temperature sensor 15b is also acquired by the communication unit 16 as one of the detection data D2 (as detection data $D2_1$). It is sufficient for the temperature sensor 15b to detect the temperature of the internal space of the fender 2. More preferably, the temperature sensor 15b detects the temperature of the body 3 described above in addition to the temperature of the internal space of the fender 2, as in this embodiment.

The communication unit 16 includes a radio wave transmission unit 16a and a radio wave reception unit 16b. The radio wave transmission unit 16a transmits a transmission radio wave R1 to the IC tag 11. The transmission radio wave R1 received by the antenna unit 13 generates power in the IC tag 11, which activates the IC tag 11. The IC tag 11 uses this power to transmit a return radio wave R2 through the antenna unit 13, and this return radio wave R2 is received by the radio wave reception unit 16b. Thus, wireless communication between the IC tag 11 and the communication unit 16 is performed by transmitting the return radio wave R2 in response to the transmission radio wave R1.

The communication unit 16 can employ commonly distributed specifications that allow wireless communication with a passive IC tag (RFID tag). Thus, the IC tag 11 and the communication unit 16 constitute a radio frequency identification (RFID) system. In this embodiment, the communication unit 16 of a portable handy type is used. Since the passive IC tag 11 is used, the communication distance of the radio waves R1 and R2 between the IC tag 11 and the communication unit 16 is, for example, about one meter.

The frequency of the radio waves (R1, R2) used for wireless communication between the IC tag 11 and the communication unit 16 is mainly in the UHF band (depending on the country, range of 860 MHz or higher and 930 MHz or lower, range of 915 MHz or higher and 930 MHz or lower in Japan), and the HF band (13.56 MHz) may be used.

Identification information A and detection data D1, D2, and $D2_1$ acquired by the communication unit 16 is input to the calculation device 17. The calculation device 17 performs various computational processing using the input data. A known computer or the like is used as the calculation device 17.

An example of a procedure for grasping the condition of the fender 2 by using this embodiment of the management system 1 will be described below.

Figure 3:
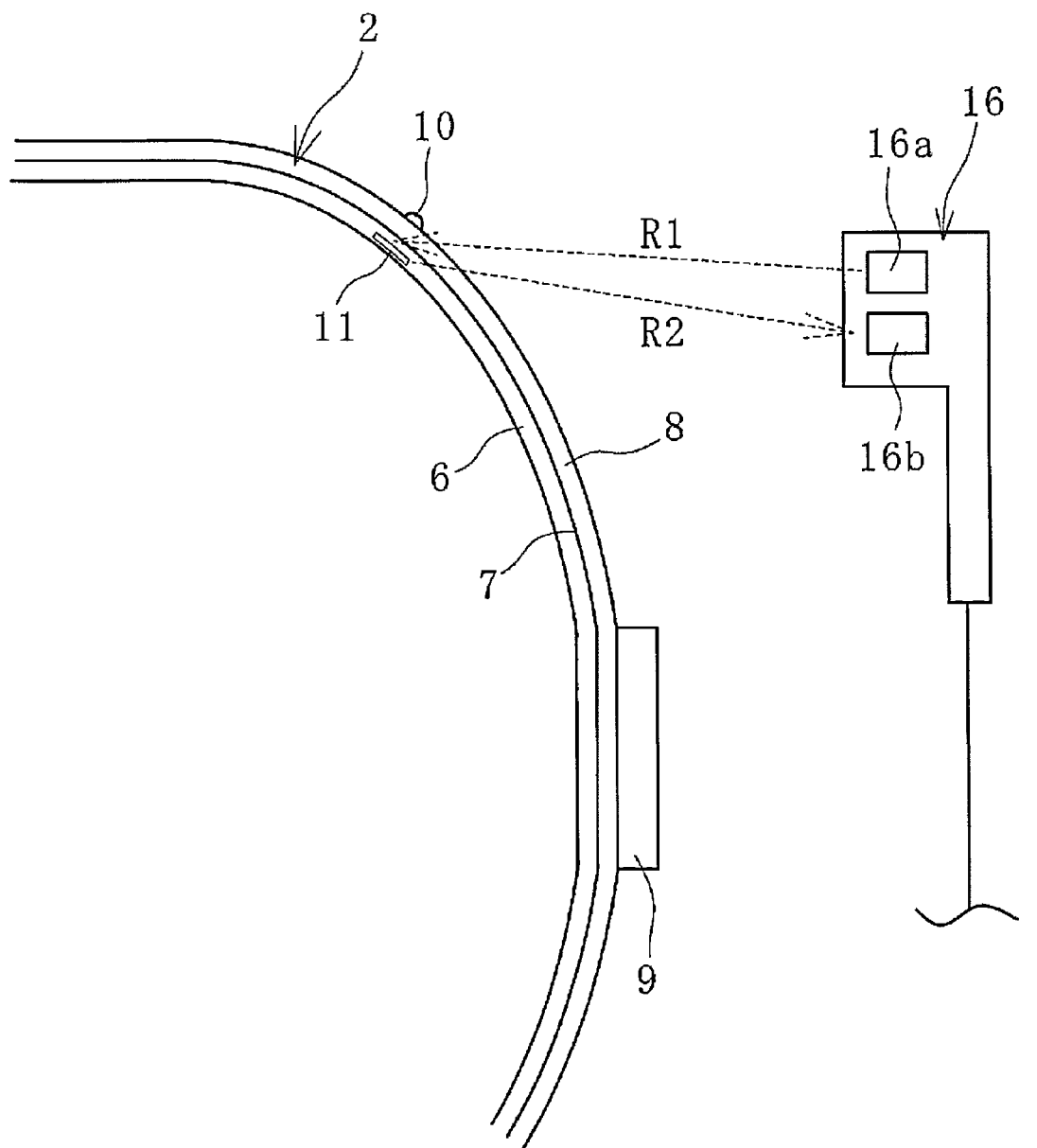
FIG. 3 is an explanatory diagram illustrating a state in which wireless communication is performed between an IC tag and a communication unit by enlarging a portion of FIG. 2.

With respect to the fender 2 installed and used at an installation location in an expanded state at a specified internal pressure as illustrated in FIG. 1, the communication unit 16 is brought close to the fender 2, and the IC tag 11 is activated by the transmission radio wave R1 transmitted from the radio wave transmission unit 16a as illustrated in FIGS. 2 and 3. When the IC tag 11 is activated, the pressure sensor 15a and the temperature sensor 15b integrated with the IC tag 11 are also activated. The return radio wave R2 transmitted from the activated IC tag 11 in response to the transmission radio wave R1 is received by the radio wave reception unit 16b, and wireless communication between the IC tag 11 and the communication unit 16 is performed.

Since the distance of this wireless communication is about one meter, it is necessary to bring the communication unit 16 close to the IC tag 11. In this embodiment, since the visible embedding mark 10 is provided on the outer surface of the body 3, it is advantageous to stably perform the wireless communication by bringing the communication unit 16 close to the embedding mark 10.

When the IC tag 11 is activated, the identification information A stored in the IC chip 12 is wirelessly communicated from the IC tag 11 by the return radio wave R2 and acquired by the communication unit 16. The detection data $D1, D2$, and $D1_1$ detected by the pressure sensor 15a and the temperature sensor 15b when the IC tag 11 is activated are wirelessly communicated from the IC tag 11 by the return radio wave R2 and acquired by the communication unit 16.

The identification information A and the detection data $D1, D2, D2_1$ acquired by the communication unit 16 are input to the calculation device 17. Each identification information A and position information (installation position information) of the fender 2 on which the IC tag 11 having each identification information A is installed are associated with each other and stored in the calculation device 17. The specification, manufacturing history, usage history, and the like of the fender 2 are also associated with the identification information A and stored in the calculation device 17. The calculation device 17 also stores tolerance ranges for each of the internal pressure, the temperature of the internal space of the fender 2, and the temperature of the body 3.

Then, the calculation device 17 specifies an individual of the fender 2 based on the input identification information A, and determines the condition of the individual fender 2 based on the input detection data $D1, D2$, and $D2_1$. That is, the condition of the fender 2 is determined by comparing the input detection data $D1, D2, D2_1$ with the corresponding tolerance ranges. As a result of the comparison, it is determined that an abnormality has occurred in the detection item out of the tolerance range, and it is determined that no abnormality has occurred in the detection item within the tolerance range.

For example, when the detection data D1 has a value lower than the tolerance range (in the case of low pressure), it can be determined that air leakage has occurred in the fender 2. It can also be determined that air leakage occurs due to the fender 2 being often pressed strongly, and the fender 2 is used under severe conditions. When the detection data D2 and $D2_1$ are higher than the tolerance range, it is determined that the fender 2 is in an abnormally high temperature state, and when they are lower than the tolerance range, it is determined that the fender 2 is in an abnormally low temperature state. It can also be determined that the fender 2 is in an abnormally high temperature state or an abnormally low temperature state and is being used under severe conditions.

There is a temperature difference between an above-water portion and an underwater portion of the body 3 due to the atmospheric temperature and the water temperature. However, there is no clear temperature difference in the temperature of the internal space of the fender 2 like the temperature difference between the above-water portion and the underwater portion of the body 3. That is, the detection data $D2_1$ is easily affected by the external environmental temperature, and the detection data D2 is less likely to be affected by the external environmental temperature than the detection data $D2_1$. Therefore, by using the temperature sensor 15b to detect the temperature of the internal space of the fender 2 separately from the temperature of the body 3, it is advantageous to obtain a more detailed determination of an effect of the temperature on the durability of the fender 2 (body 3).

It is considered that a degree of deterioration of the body 3 also varies according to a difference (temperature difference) between the detection data D2 (the internal temperature of the fender 2) and the detection data $D2_1$ (the temperature of the body 3). Therefore, it is also possible to determine the effect on the durability of the fender 2 (body 3) based on the difference between the detection data D2 and the detection data $D2_1$. The detection data D2 and the detection data $D2_1$ differ depending on the installation positions of the temperature sensor 15b. Therefore, in order to determine the distribution of the detection data D2 (the internal temperature of the fender 2) and the detection data $D2_1$ (the temperature of the body 3) in the fender 2, it is preferable to install the IC tags 11 at multiple sections separated from each other.

The fender 2 installed in a horizontal state rotates in the circumferential direction, and IC tag 11 installed at one section may thus be located underwater. In this case, wireless communication between the IC tag 11 and the communication unit 16 becomes substantially impossible. Therefore, the IC tags 11 are preferably disposed at multiple sections spaced apart in the circumferential direction of the body 3. For example, the IC tags 11 are installed at two to four sections at equal intervals in the circumferential direction of the body 3. The fender 2 may be installed in a vertical state. Therefore, in this case, if the IC tag 11 is installed only at one bowl-shaped end portion 5, the IC tag 11 may be located underwater. Therefore, it is preferable that the IC tag 11 is installed in each of the bowl-shaped end portions 5.

According to this embodiment, the identification information A and the detection data $D1, D2, D2_1$ can be acquired by performing wireless communication between the IC tag 11 and the communication unit 16. Then, based on the acquired identification information A and the detection data $D1, D2, D2_1$, the condition of each fender 2 can be easily grasped. The pressure sensor 15a and the temperature sensor 15b are installed on the IC tag 11 and are integrated with the IC tag 11, allowing man-hours for mounting these parts on the fender 2 to be reduced. Furthermore, the IC tag 11, the pressure sensor 15a, and the temperature sensor 15b are activated by the transmission radio wave R1 transmitted from the communication unit 16. Therefore, it is not necessary to provide a battery in these parts. Therefore, there is no need to replace the battery of these parts, and there is no risk of data being unable to be acquired due to a weak battery. This improves maintainability and is advantageous for stably grasping the condition of each fender 2 for the long term.

As illustrated in FIG. 1, when a plurality of fenders 2 are used in tandem, the severity of the fenders 2 varies depending on the installation position, and the degree of wear of each fender 2 also varies accordingly. In the management system 1, the severity (use state) of each fender 2 and the use history of each fender 2 can be grasped. Therefore, based on the data, it is advantageous to perform appropriate rotation of the installation position such that the wear state of each fender 2 becomes uniform.

When the fender 2 is stored in a warehouse or the like, the fender 2 is stored in an expanded state at a predetermined internal pressure. In determining the condition of the fenders 2, wireless communication between the IC tag 11 and the communication unit 16 is performed by the above-described procedure. Then, an individual of the fenders 2 is specified, and the condition of the fender 2 is determined based on the detection data D1, D2, D2$_1$. Air leakage of the fender 2 over time can be easily grasped based on the detection data D1. For the fender 2 whose internal pressure is lower than the reference value due to the air leakage, it is advantageous to quickly perform operation of replenishing air.

Figure 7:
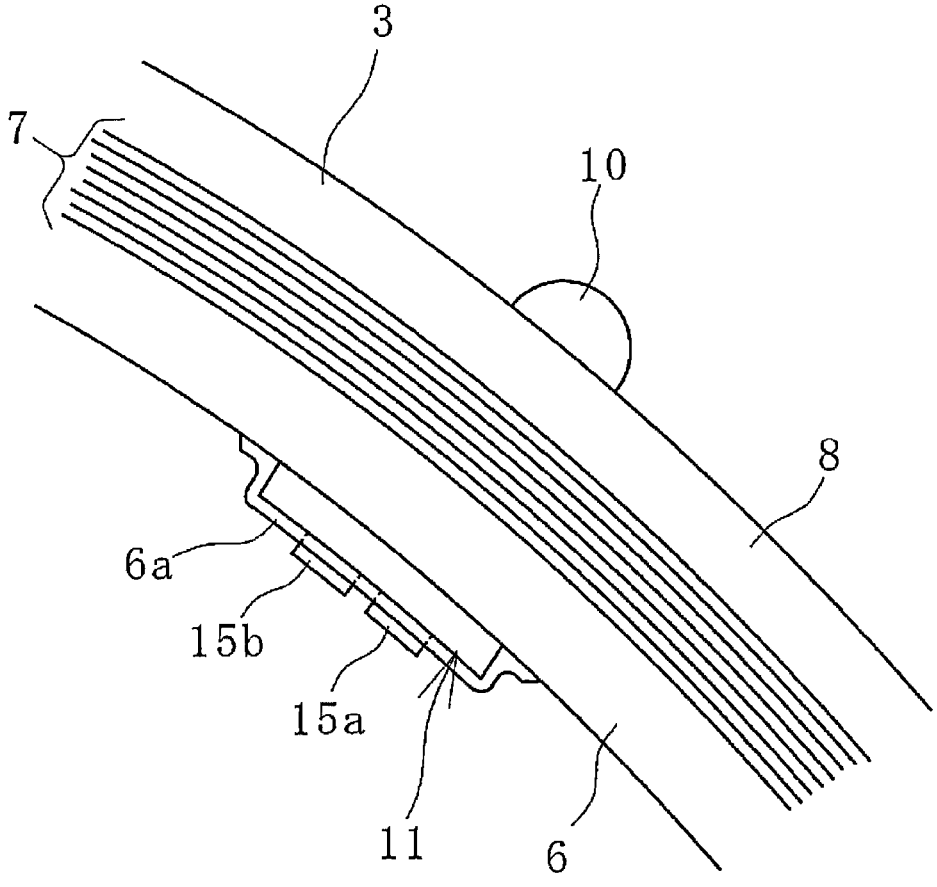
FIG. 7 is an explanatory diagram illustrating another attachment structure of the IC tag to the fender.

The IC tag 11 illustrated in FIG. 7 is covered with coating rubber 6a and embedded in the body 3 of the fender 2 that has already been manufactured. Specifically, the IC tag 11 is bonded to the inner layer rubber 6 and entirely covered with the coating rubber 6a. However, the detection portions of the pressure sensor 15a and the temperature sensor 15b are not covered with the coating rubber 6a and are exposed to the internal space of the fender 2. The coating rubber 6a is bonded to the inner layer rubber 6. The same kind of rubber as the inner layer rubber 6 may be used for the coating rubber 6a.

If the fender 2 that has already been manufactured is large (for example, the outer diameter of the body portion 4 is two meters or more), workers can enter and exit the inside of the fender 2 through the cap portion 9. Therefore, as illustrated in FIG. 7, the IC tag 11 can be attached afterward to the fender 2 that has been already manufactured with the IC tag 11 embedded in the body 3. When the IC tag 11 is attached later to the body 3 in this manner, the management system 1 can be applied to the fender 2 that has already been manufactured.

Figure 8:
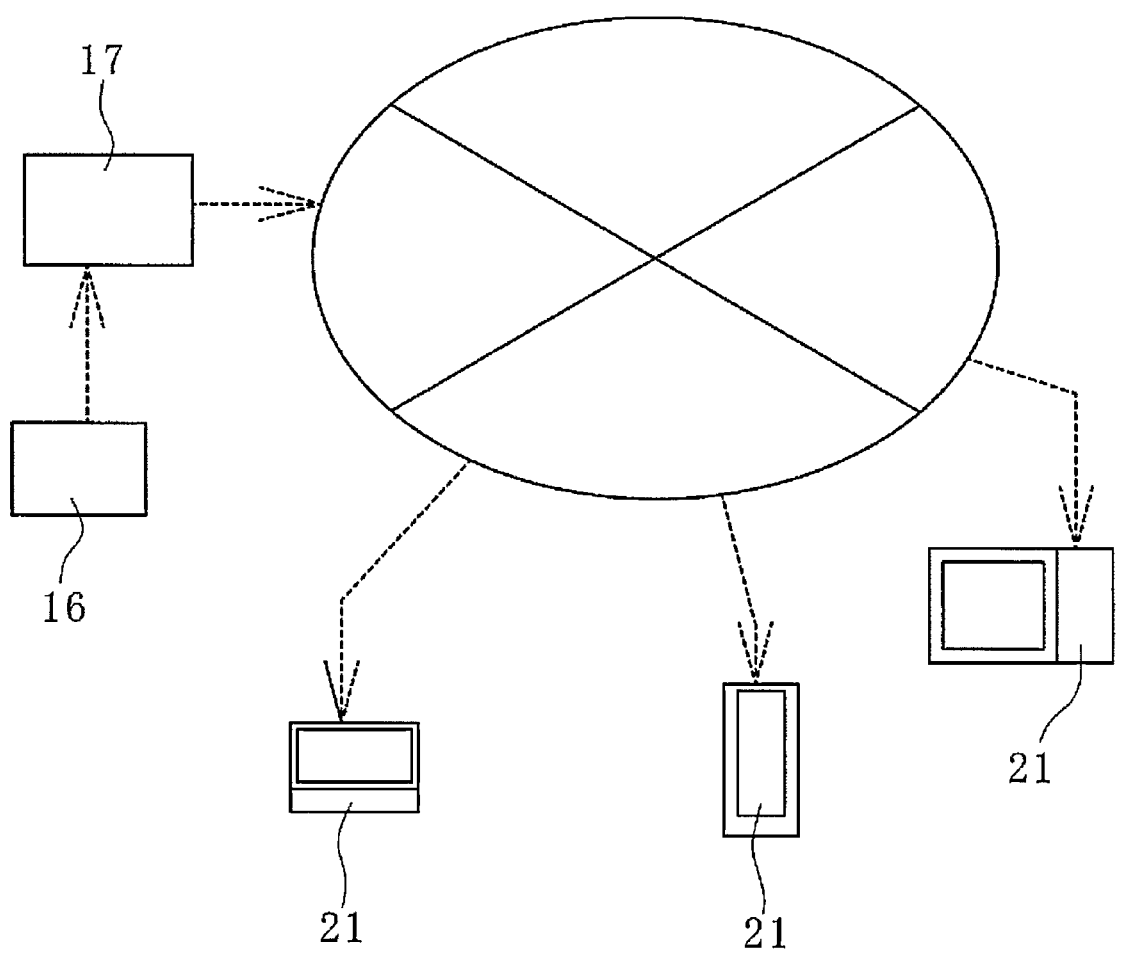
FIG. 8 is an explanatory diagram illustrating a configuration of the management system in which a calculation device and terminal devices are connected through a communication network.

As illustrated in FIG. 8, the calculation device 17 may be configured to be connected to desired terminal devices 21 via a communication network such as the Internet. For example, various pieces of information (data) are transmitted from the calculation device 17 to the terminal devices 21 of relevant parties such as a control room of an operating company (user) of the fender 2, a sales company of the fender 2, or a manufacturing company, which are located remotely from the location where the fender 2 is used. The information to be transmitted to each of the terminal devices 21 is, for example, the detection data D1, D2, D2$_1$ of each fender 2 acquired by the communication unit 16 and the determination result of the condition of the fender 2 by the calculation device 17. According to this configuration, the relevant persons having these terminal devices 21 can grasp the internal and external states of the fender 2 while being remotely located to the place where the fender 2 is used.

Figure 9:
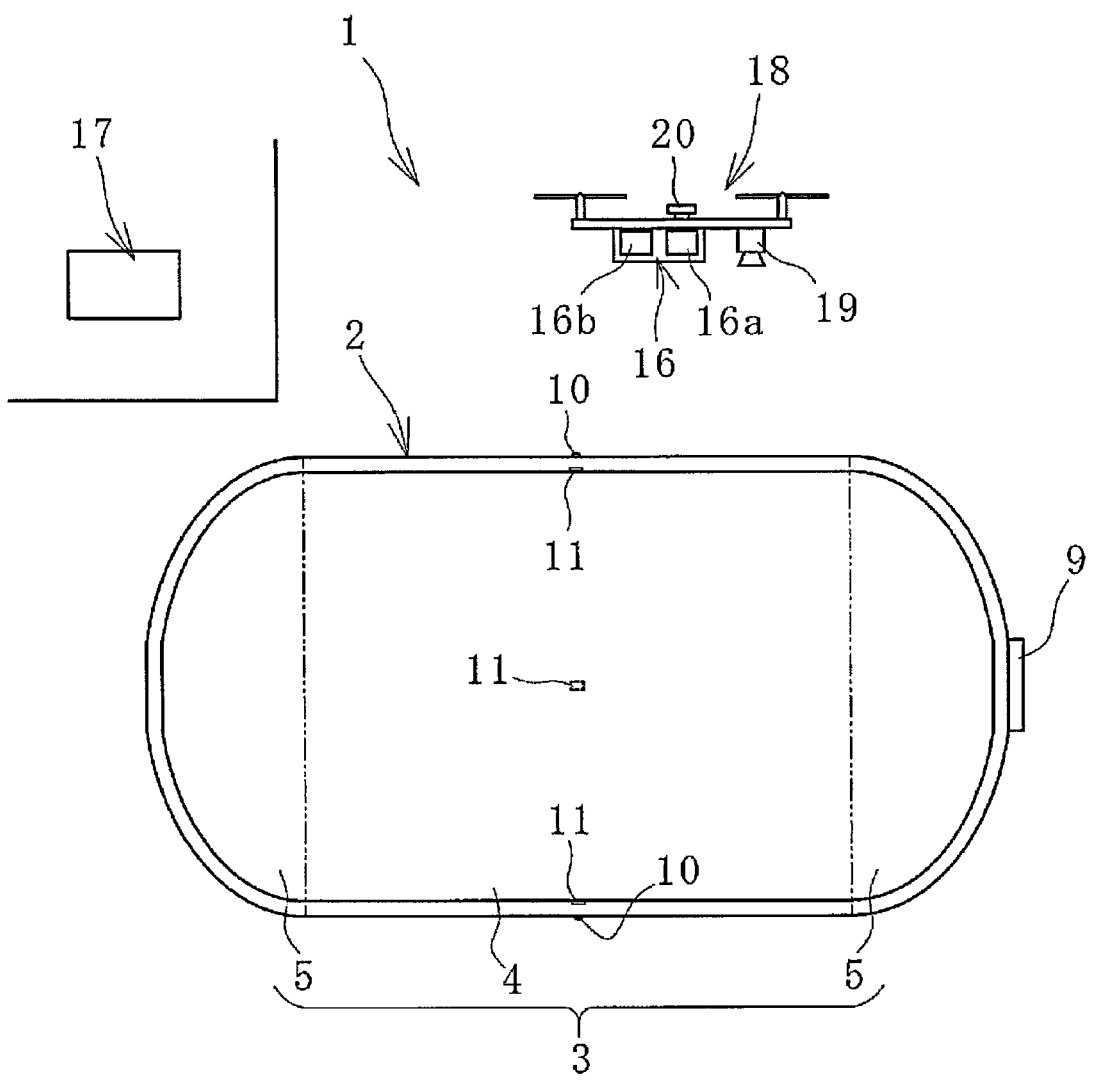
FIG. 9 is an explanatory diagram illustrating another embodiment of the management system, with the fender in a longitudinal cross-sectional view.
Figure 10:
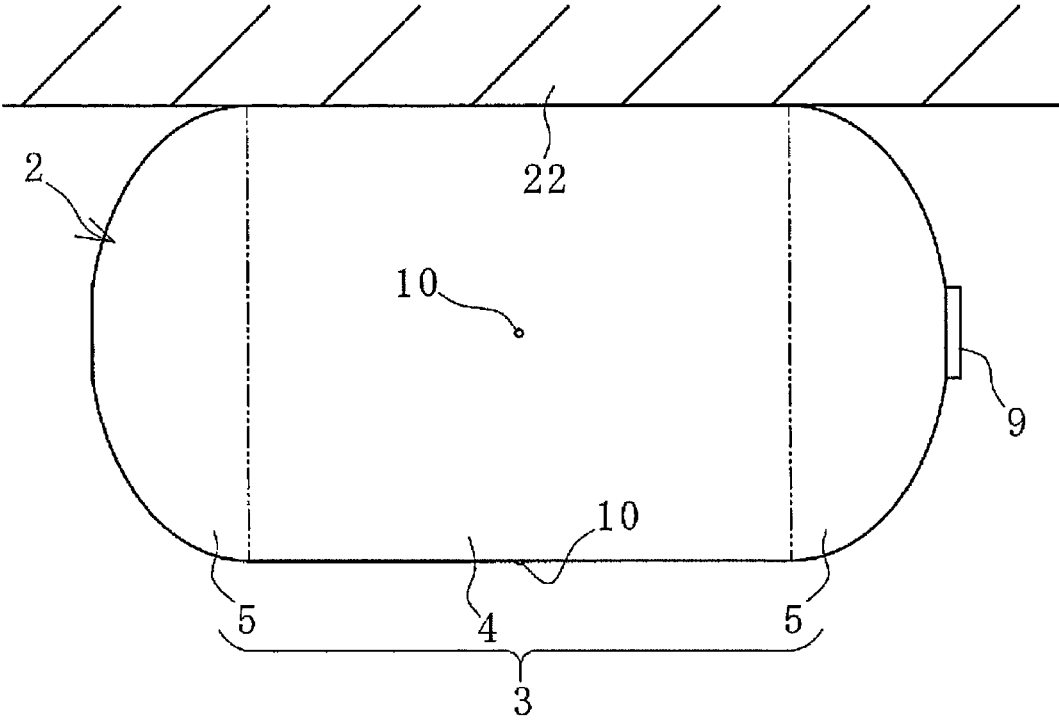
FIG. 10 is an explanatory diagram illustrating reference image data of a top view of the fender.
Figure 11:
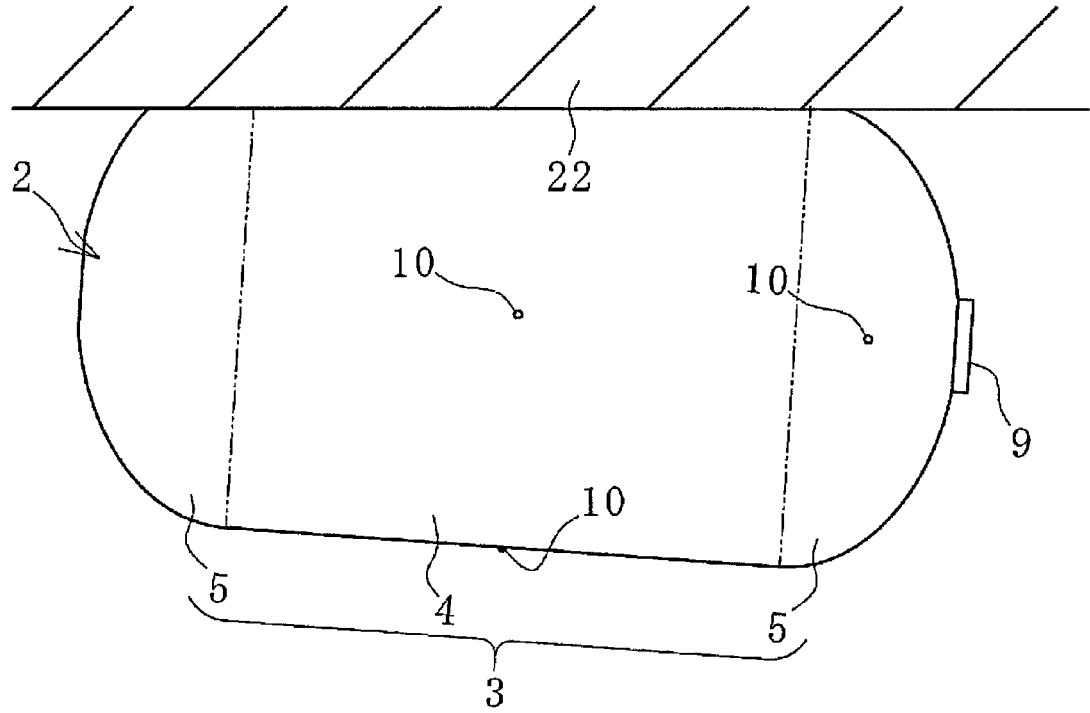
FIG. 11 is an explanatory diagram illustrating image data of a top view of the fender acquired by a camera device.

In another embodiment of the management system 1 illustrated in FIG. 9, a drone 18 and a camera device 19 are further added to the foregoing embodiment. The communication unit 16 and the camera device 19 are installed on the drone 18. Other configurations are substantially the same as those in the foregoing embodiment, and the various specifications described above can also be applied. The camera device 19 can be optionally provided. However, providing the camera device 19 is advantageous in grasping the condition of the fender 2 in more detail. In FIGS. 9 to 11, the boundary between the body portion 4 and each bowl-shaped end portion 5 is illustrated by a two-dot chain line for reference.

In this embodiment, the calculation device 17 is located at a location remote from the place where the fender 2 is used, and the communication unit 16 and the calculation device 17 are configured separately and independently. The communication unit 16 and the calculation device 17 may be integrated and installed on the drone 18.

The camera device 19 acquires image data M of the fender 2 from the airspace above the fender 2. As the camera device 19, various known digital cameras and the like that acquire the image data M of still images or moving images can be adopted. The image data M acquired by the camera device 19 is input to the calculation device 17.

The drone 18 can employ known specifications that allow the drone 18 to fly to a desired position and hover in a fixed position while installed with the communication unit 16 and the camera device 19 described above. The drone 18 is equipped with a GNSS receiver 20, and the position coordinates of the drone 18 are grasped in real time by the GNSS receiver 20. Inputting the position coordinates of the desired position into a control unit of the drone 18 allows the drone 18 to fly to the desired position by automatic control operation.

The calculation device 17 has already received reference image data Mc that indicates the fender 2 in a sound condition without twisting and without any unnecessary deformation as illustrated in FIG. 10. The reference image data Mc may be image data actually photographed from the airspace above the fender 2 or data prepared from design data or the like. For example, an output means such as a monitor is connected to the calculation device 17.

An example of a procedure for grasping the condition of the fender 2 by using the embodiment of the management system 1 as illustrated in FIG. 9 will be described below.

As illustrated in FIG. 9, the drone 18 is flown from a measurement base located, for example, on land or on a ship, and moved into the airspace above and near the fender 2. For example, based on the position information of the fender 2 grasped in advance, the GNSS receiver 20 installed on the drone 18 is used to move the drone 18 to the airspace above the fender 2 by automatic operation. In performing wireless communication between the IC tag 11 and the communication unit 16, the drone 18 continues to be positioned in the airspace above and near the IC tag 11 by automatic operation, and the separation distance between the IC tag 11 and the communication unit 16 is maintained at about one meter. Alternatively, the drone 18 can be positioned in the airspace above and near the IC tag 11 by operation from a drone operator based on the image data M acquired in real time by the camera device 19. In this embodiment, when the embedding mark 10 is provided on the outer surface of the body portion 4, the communication unit 16 can be easily brought close to the IC tag 11 using the embedding mark 10 as a sign.

With the drone 18 (the communication unit 16) positioned in the airspace above and near the IC tag 11, the IC tag 11 is activated by the transmission radio wave R1 transmitted from the radio wave transmission unit 16a. The return radio wave R2 transmitted from the IC tag 11 in response to the transmission radio wave R1 is received by the radio wave reception unit 16b, and wireless communication between the IC tag 11 and the communication unit 16 is performed.

The procedure for grasping the condition of the fender 2 is the same as in the foregoing embodiment, but in this embodiment, as illustrated in FIG. 9, while the drone 18 is in the airspace above the fender 2, the camera device 19 acquires image data Mr of the fender 2. As illustrated in FIG. 11, it is preferable to acquire the image data Mr that covers the entity of the fender 2. The timing of acquiring the image data Mr may be before or after performing wireless communication between the IC tag 11 and the communication unit 16.

The acquired image data Mr is input to the calculation device 17. The calculation device 17 determines the external state of the fender 2 based on the difference between the input image data Mr and the preset reference image data Mc. For example, each external shape (contour) of the fender 2 of the reference image data Mc illustrated in FIG. 10 and the acquired image data Mr illustrated in FIG. 11 are compared. The calculation device 17 determines that an abnormal deformation has occurred in the fender 2 when the degree of deformation of the fender 2 of the image data Mr relative to the fender 2 of the reference image data Mc exceeds a preset tolerance range, and determines that no abnormal deformation has occurred when the degree of deformation is within this tolerance range. Superimposing the fenders 2 on the reference image data Mc and the image data Mr allows the degree of deformation of the fender 2 to be easily calculated by the calculation device 17. As a result, it is advantageous to grasp the damage or the like of the fender 2 early.

Alternatively, the arrangement of the fender 2 at the attachment location, such as the quay 22, of the reference image data Mc and the image data Mr are compared. The calculation device 17 determines that an abnormal displacement has occurred in the fender 2 when the degree of displacement of the fender 2 of the image data Mr relative to the fender 2 of the reference image data Mc exceeds a preset tolerance range, and determines that no abnormal displacement has occurred when the degree of displacement is within this tolerance range. As a result, it is advantageous to grasp the attachment abnormality of the fender 2 or the like early.

According to this embodiment, in performing wireless communication between the IC tag 11 and the communication unit 16, the drone 18 is moved into the airspace above and near the IC tag 11. Therefore, the worker does not need to move close to the IC tag 11 to bring the communication unit 16 close to the IC tag 11, making the work much lighter. Even when the fender 2 is large (for example, the outer diameter of the body portion 4 is two meters or more), this wireless communication can be easily performed.

Further, by providing the camera device 19, the external state of the fender 2 can be grasped by comparing the reference image data Mc and the image data Mr. That is, it is advantageous to grasp the condition of the fender 2 in more detail by using the image data Mr as well as the detection data D1, D2, and D2$_1$ by the pressure sensor 15a and the temperature sensor 15b. In this embodiment, when the calculation device 17 is connected to the desired terminal device 21 via a communication network as illustrated in FIG. 8, the image data Mr of each fender 2 acquired by the camera device 19 can also be transmitted from the calculation device 17 to the terminal device 21.

REFERENCE SIGNS LIST

1 Management system
2 Pneumatic fender
2a Guy rope
3 Body
4 Body portion
5 Bowl-shaped end portion
6 Inner layer rubber
6a Coating rubber
7 Reinforcing layer
8 Outer layer rubber
9 Cap portion
10 Embedding mark
11 IC tag 12 IC chip
13 Antenna unit
14 Substrate
14a Insulating layer
15a Pressure sensor
15b Temperature sensor
16 Communication unit
16a Radio wave transmission unit
16b Radio wave reception unit
17 Calculation device
18 Drone
19 Camera device
20 GNSS receiver
21 Terminal device
22 Quay
A Identification information
D1, D2 Detection data
M Image data

The invention claimed is:

1. A management system of a pneumatic fender, the management system comprising:

a pneumatic fender comprising a body comprising a body portion having a cylindrical shape, bowl-shaped end portions connected to both sides of the body portion in an axial direction, and a cap portion attached to at least one of the bowl-shaped end portions;

an IC tag of a passive type installed in the pneumatic fender;

a pressure sensor configured to detect an internal pressure of the pneumatic fender and a temperature sensor configured to detect a temperature of an internal space of the pneumatic fender; and a communication unit disposed outside the pneumatic fender, wherein an individual of the pneumatic fender being specified based on identification information of the IC tag acquired by the communication unit, a condition of the pneumatic fender being determined based on detection data from the pressure sensor and the temperature sensor acquired by the communication unit;

the pressure sensor and the temperature sensor being installed on the IC tag and integrated with the IC tag, the management system comprising a calculation device to be communicably connected to the communication unit, the IC tag being activated by a transmission radio wave transmitted from the communication unit, the pressure sensor and the temperature sensor being activated, a return radio wave being transmitted from the IC tag activated in response to the transmission radio wave, and wireless communication between the IC tag and the communication unit being thus performed, the identification information being acquired by the communication unit through the wireless communication and being input to the calculation device, and the detection data from the pressure sensor and the temperature sensor when the IC tag is activated being acquired by the communication unit through the wireless communication and being input to the calculation device, by the calculation device, an individual of the pneumatic fender being specified based on the identification information input, and a condition of the pneumatic fender being determined based on each detection data input, the IC tag is embedded in the body, and

an embedding mark indicating an embedding position of the IC tag is provided on an outer surface of the body corresponding to the embedding position of the IC tag.

2. The management system of a pneumatic fender according to claim 1, wherein the IC tag is embedded in the body.

3. The management system of a pneumatic fender according to claim 2, comprising a plurality of said substrate constituting the IC tag, which are disposed at multiple sections spaced apart in a circumferential direction of the body.

4. The management system of a pneumatic fender according to claim 2, wherein an antenna unit constituting the IC tag is a dipole type and consists of a metal monofilament.

5. The management system of a pneumatic fender according to claim 2, wherein the temperature sensor is configured to detect a temperature of the body at a position where the temperature sensor is embedded, and the temperature of the body detected by the temperature sensor is also used as the detection data from the temperature sensor.

6. A management system of a pneumatic fender, the management system comprising:

a pneumatic fender comprising a body comprising a body portion having a cylindrical shape, bowl-shaped end portions connected to both sides of the body portion in an axial direction, and a cap portion attached to at least one of the bowl-shaped end portions;

an IC tag of a passive type installed in the pneumatic fender;

a pressure sensor configured to detect an internal pressure of the pneumatic fender and a temperature sensor configured to detect a temperature of an internal space of the pneumatic fender; and a communication unit disposed outside the pneumatic fender, wherein an individual of the pneumatic fender being specified based on identification information of the IC tag acquired by the communication unit,

a condition of the pneumatic fender being determined based on detection data from the pressure sensor and the temperature sensor acquired by the communication unit;

the pressure sensor and the temperature sensor being installed on the IC tag and integrated with the IC tag, the management system comprising a calculation device to be communicably connected to the communication unit, the IC tag being activated by a transmission radio wave transmitted from the communication unit, the pressure sensor and the temperature sensor being activated, a return radio wave being transmitted from the IC tag activated in response to the transmission radio wave, and wireless communication between the IC tag and the communication unit being thus performed, the identification information being acquired by the communication unit through the wireless communication and being input to the calculation device, and the detection data from the pressure sensor and the temperature sensor when the IC tag is activated being acquired by the communication unit through the wireless communication and being input to the calculation device, by the calculation device, an individual of the pneumatic fender being specified based on the identification information input, and a condition of the pneumatic fender being determined based on each detection data input, and the communication unit is mounted on a drone.

7. The management system of a pneumatic fender according to claim 6, wherein a camera device is mounted on the drone, image data acquired by the camera device is input to the calculation device, and the calculation device determines, based on the image data input, a condition of the pneumatic fender.

* * * * *